United States Patent
Kim et al.

(10) Patent No.: US 12,369,511 B2
(45) Date of Patent: Jul. 29, 2025

(54) METHOD FOR PRESETTING COMPENSATION ANGLE FOR STEERING CLEARANCE AND AUTONOMOUS AGRICULTURAL MACHINE USING COMPENSATION ANGLE

(71) Applicant: GINT CO., LTD., Gyeonggi-do (KR)

(72) Inventors: Yong Hyeon Kim, Gyeonggi-do (KR); Seung Rak Son, Gyeonggi-do (KR); Tae Kyoung Lee, Gyeonggi do (KR)

(73) Assignee: GINT CO., LTD., Gyeonggi-do (KR)

( * ) Notice: Subject to any disclaimer, the term of this patent is extended or adjusted under 35 U.S.C. 154(b) by 0 days.

(21) Appl. No.: 18/763,086

(22) Filed: Jul. 3, 2024

(65) Prior Publication Data
US 2024/0349637 A1    Oct. 24, 2024

Related U.S. Application Data

(63) Continuation of application No. PCT/KR2023/004046, filed on Mar. 27, 2023.

(30) Foreign Application Priority Data

Oct. 25, 2022 (KR) .................. 10-2022-0138521

(51) Int. Cl.
A01B 69/04 (2006.01)
(52) U.S. Cl.
CPC ................... *A01B 69/008* (2013.01)
(58) Field of Classification Search
CPC .............. A01B 69/008; A01B 69/04
(Continued)

(56) References Cited

U.S. PATENT DOCUMENTS 6,385,515 B1 * 5/2002 Dickson ............... G06V 20/588
701/28
6,445,983 B1 * 9/2002 Dickson ............... G05D 1/0274
701/472
(Continued)

FOREIGN PATENT DOCUMENTS

| CA | 3084913 A1 * | 1/2021 | ........... A01B 69/008 |
| CA | 3085682 A1 * | 1/2021 | ........... A01B 69/008 |

(Continued)

OTHER PUBLICATIONS

International Search Report of Corresponding PCT Application No. PCT/KR2023/004046 mailed Oct. 25, 2022, 4 pages.

(Continued)

*Primary Examiner* — Atul Trivedi
(74) *Attorney, Agent, or Firm* — Guntin & Gust, PLC; Miyoung Shin

(57) ABSTRACT

Embodiments relate to a method for presetting a compensation angle for steering clearance, an apparatus for performing same, and an autonomous agricultural machine in which the apparatus is installed, the method comprising: driving an agricultural machine while a steering wheel is in a reference state; supplying a control signal to a steering control motor so that the steering wheel rotates in one direction in the reference state; receiving, by a calculation unit, a measurement result of the control signal from a current sensor; and determining a compensation angle for the steering clearance on the basis of a current measurement result of the control signal.

9 Claims, 8 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 6,694,260 | B1* | 2/2004 | Rekow ................. | G01C 21/165 701/472 |
| 2004/0060765 | A1* | 4/2004 | Mattson ................ | B60T 8/1755 180/422 |
| 2007/0088477 | A1* | 4/2007 | Brewer ................. | G01C 21/188 701/41 |
| 2009/0099730 | A1* | 4/2009 | McClure ............... | G05D 1/0278 701/41 |
| 2009/0276127 | A1* | 11/2009 | Dix ...................... | G01C 21/005 701/50 |
| 2010/0312428 | A1* | 12/2010 | Roberge ................ | G05D 1/027 717/106 |
| 2012/0174445 | A1* | 7/2012 | Jones ..................... | G01S 19/41 37/197 |
| 2012/0215410 | A1* | 8/2012 | McClure ................ | G01S 19/14 701/50 |
| 2012/0296529 | A1* | 11/2012 | Peake .................... | G05D 1/0274 701/50 |
| 2016/0252909 | A1* | 9/2016 | Webber ................. | A01B 79/005 701/41 |
| 2017/0267276 | A1* | 9/2017 | Kodera ................. | B62D 5/0463 |
| 2017/0311534 | A1* | 11/2017 | Rusciolelli ........... | A01B 79/005 |
| 2017/0322550 | A1* | 11/2017 | Yokoyama ........... | G05D 1/0022 |
| 2018/0015945 | A1* | 1/2018 | Kim ....................... | B62D 6/08 |
| 2020/0236833 | A1* | 7/2020 | Kremmer .............. | A01B 63/10 |
| 2021/0000005 | A1* | 1/2021 | Robinson .............. | G05D 1/0212 |
| 2021/0000006 | A1* | 1/2021 | Ellaboudy ............ | A01B 69/008 |
| 2021/0088354 | A1* | 3/2021 | Anderson ............. | A01B 69/008 |
| 2021/0195823 | A1* | 7/2021 | Yuasa .................... | G05D 1/0278 |
| 2021/0212249 | A1* | 7/2021 | Disberger ............. | A01M 7/0089 |
| 2022/0287218 | A1* | 9/2022 | Yuasa ..................... | B60K 31/00 |
| 2022/0350344 | A1* | 11/2022 | Horstmann ........... | G05D 1/0212 |
| 2022/0408631 | A1* | 12/2022 | Sakaguchi ............ | B60Q 1/143 |
| 2023/0229163 | A1* | 7/2023 | Rust ...................... | G05D 1/0212 701/50 |
| 2024/0180063 | A1* | 6/2024 | Kocer .................... | G05D 1/80 |
| 2024/0337500 | A1* | 10/2024 | Kubota ................. | G01C 21/34 |
| 2025/0040462 | A1* | 2/2025 | Kawahata ............. | A01B 69/008 |
| 2025/0044797 | A1* | 2/2025 | Kawahata ............. | A01B 69/008 |
| 2025/0086922 | A1* | 3/2025 | Acuna Marrero ..... | G06V 20/70 |

FOREIGN PATENT DOCUMENTS

| | | | | |
|---|---|---|---|---|
| CA | 3201409 | A1 * | 6/2022 | ............... A01B 1/00 |
| CN | 106828187 | A | 6/2017 | |
| CN | 113401217 | A * | 9/2021 | ........... A01B 69/008 |
| CN | 115280960 | A * | 11/2022 | ........... A01B 69/008 |
| DE | 102016209270 | A1 * | 11/2017 | ........... A01B 69/008 |
| EP | 1266553 | A2 * | 12/2002 | ........... A01B 69/008 |
| EP | 1475609 | A2 * | 11/2004 | ............. A01B 69/00 |
| EP | 1787889 | A1 * | 5/2007 | ........... A01B 69/008 |
| EP | 2020168 | A1 * | 2/2009 | ........... A01B 69/001 |
| EP | 3170380 | A1 * | 5/2017 | ........... A01B 69/004 |
| EP | 3632774 | A1 * | 4/2020 | ............. B62D 5/008 |
| EP | 3685649 | A1 * | 7/2020 | ........... A01B 69/001 |
| EP | 3794919 | A1 * | 3/2021 | ........... A01B 69/008 |
| EP | 4278887 | A2 * | 11/2023 | ........... A01B 69/008 |
| EP | 4394539 | A1 * | 7/2024 | ........... A01B 69/008 |
| EP | 4501091 | A1 * | 2/2025 | ........... A01B 69/008 |
| EP | 4501092 | A1 * | 2/2025 | ........... A01B 69/008 |
| FR | 2834495 | A1 * | 7/2003 | ............. B62D 13/04 |
| KR | 101339750 | B1 | 12/2013 | |
| KR | 20130139475 | A | 12/2013 | |
| KR | 101606318 | B1 | 4/2016 | |
| KR | 102093853 | B1 | 3/2020 | |
| KR | 20210088085 | A | 7/2021 | |
| KR | 102507888 | B1 | 3/2023 | |
| WO | WO-2009019444 | A1 * | 2/2009 | ............. B62D 13/00 |
| WO | WO-2018179777 | A1 * | 10/2018 | ............. A01B 69/00 |
| WO | WO-2019054057 | A1 * | 3/2019 | ............. A01B 69/00 |
| WO | WO-2021005406 | A1 * | 1/2021 | ........... A01B 69/008 |
| WO | WO-2021044970 | A1 * | 3/2021 | ............. A01B 63/10 |
| WO | WO-2021044971 | A1 * | 3/2021 | ........... A01B 69/008 |
| WO | WO-2023276341 | A1 * | 1/2023 | ............. A01B 69/00 |
| WO | WO-2023095856 | A1 * | 6/2023 | ........... A01B 69/008 |
| WO | WO-2023127390 | A1 * | 7/2023 | ........... A01B 69/007 |
| WO | WO-2023127391 | A1 * | 7/2023 | ............. A01B 69/00 |

OTHER PUBLICATIONS

Korean Notice of Allowance of Corresponding KR Application No. 10-2022-0138521, mailed Feb. 16, 2023 and English translation, 4 pages.

Korean Office Action for Corresponding KR Application No. 10-2022-0138521 mailed Dec. 9, 2022, 12 pages.

Written Decision on Registration for corresponding Korean patent application No. 10-2023-0027982, mailed Feb. 26, 2025, 8 pages.

* cited by examiner

METHOD FOR PRESETTING COMPENSATION ANGLE FOR STEERING CLEARANCE AND AUTONOMOUS AGRICULTURAL MACHINE USING COMPENSATION ANGLE

CROSS-REFERENCE TO RELATED APPLICATION(S)

This application is a continuation of PCT Patent Application No. PCT/KR2023/004046, filed Mar. 27, 2023 by KIM et al., entitled "METHOD FOR PRESETTING COMPENSATION ANGLE FOR STEERING CLEARANCE AND AUTONOMOUS AGRICULTURAL MACHINE USING COMPENSATION ANGLE," which claims priority to Korean Patent Application No. 10-2022-0138521, filed Oct. 25, 2022. All sections of the aforementioned application(s) are incorporated herein by reference in its entirety.

FIELD OF THE DISCLOSURE

Embodiments of the present disclosure relate to a technology for presetting a compensation angle for a steering clearance which is an error between a rotation change of a steering wheel and a steering change of a wheel in an autonomous agricultural machine.

BACKGROUND

Agricultural machines are treated as very important elements to reduce the high labor burden and production costs in response to labor shortages due to the declines and aging of the working population in rural areas. Agricultural machines are for performing a variety of work necessary for farming and enables various types of work such as plowing work, rotary work, pest control work, and transplanting work and are divided into walk-behind work apparatuses in which a worker operates the agricultural machine while walking along with the agricultural machine, and riding-type work apparatuses in which a worker sits on a driver's seat provided on the agricultural machine and operates the agricultural machine.

Recently, due to the development of autonomous driving technology and wireless communication technology, there have been attempts to attach an autonomous driving device to an agricultural machine and allow the autonomous driving device to autonomously drive the agricultural machine using Global Positioning System (GPS) data and other sensing data. In particular, a telematics device capable of performing wireless communication with a server of an agricultural machine manufacturer for an agricultural machine-related state and control information is also electrically connected to an agricultural machine to which an autonomous driving device is attached. By using the autonomous driving device and the telematics device, a user can control the operation of the agricultural machine without having to go directly to the agricultural machine, and an application installed on a user's smartphone can communicate with a server to obtain information about a current state and a surrounding environment of the agricultural machine that is far away from the user and can control the autonomous driving of the agricultural machine, thereby performing agricultural work in a wireless manner.

In order to perform autonomous driving remotely, when a user in a remote place inputs an autonomous driving route to a smartphone, a server or an autonomous driving device of an agricultural machine calculates a steering angle for traveling along the input route, and a steering wheel, referred to as a handle in Korea, is controlled according to the calculated steering angle.

However, a steering clearance is present in an agricultural machine. The steering clearance is a structural defect between steering components in which the wheel does not rotate at the steering angle even when the steering wheel rotates. When a vehicle has steering clearance, it is generally for the wheels to rotate at an angle that is less than the intended rotation angle as the steering wheel is rotated. The steering clearance may occur, for example, in the coupling at least two components between the steering wheel and a steering shaft or in the coupling at least two components between the steering shaft and an arm connected to the wheels. The steering clearance is expressed as a certain steering angle from a rotation start point of the steering wheel to a rotation start point of the wheel.

Agricultural machines have different steering clearances according to manufacturers and product specifications of machine types. When an autonomous driving device is attached to the existing agricultural machine and used an error may occur between a steering angle of a steering wheel for autonomous driving and an actual steering angle of a wheel due to a steering clearance. As a result, even when an accurate steering angle suitable for a driving route is input, an agricultural machine autonomously travels at a different steering angle, which reduces the driving accuracy of the agricultural machine.

SUMMARY

Based on the above discussion, embodiments of the present disclosure are directed to providing a method of presetting a compensation angle for a steering clearance to more accurately control a steering angle of an autonomous agricultural machine, and an autonomous agricultural machine for performing the same.

A method of presetting a compensation angle for a steering clearance according to one aspect of the present disclosure is performed by a computing device including a processor. The computing device is installed on an autonomous agricultural machine and includes a calculation unit configured to process an autonomous driving-related operation, a driving unit configured to supply a control signal in a form of a current to a steering control motor configured to control rotation of a steering wheel according to an instruction of the calculation unit, and a current sensor configured to measure the control signal.

The method includes driving an agricultural machine having the steering wheel in a reference state, supplying the control signal to the steering control motor such that the steering wheel in the reference state rotates in one direction, receiving, by the calculation unit, a measurement result of the control signal from the current sensor, and determining a compensation angle for the steering clearance based on a current measurement result of the control signal, In one embodiment, the computing device may further include a Global Positioning System (GPS) communication unit.

The determining of the compensation angle for the steering clearance based on the current measurement result of the control signal may include obtaining GPS information of the traveling agricultural machine, detecting a current section in which a change in steering angle of a wheel occurs among detected current sections based on the GPS information of the agricultural machine, and determining the compensation angle for the steering clearance based on a rotation angle of the steering wheel in the current section in which the change in steering angle of the wheel occurs.

In one embodiment, the driving unit may be configured to supply a relatively small control signal to the steering control motor when load capacity of the steering control motor is relatively low and supply a relatively large control signal to the steering control motor when the load capacity of the steering control motor is relatively high.

The supplying of the control signal to the steering control motor such that the steering wheel in the reference state rotates in one direction may include, when the steering wheel rotates within a range of the steering clearance, supplying an increased control signal as compared to when the steering control motor stops, and when the steering wheel rotates beyond the range of the steering clearance, supplying an increased control signal as compared to when the steering wheel rotates within the range of the steering clearance.

In one embodiment, in components of a steering system that constitutes an entire coupling section from the steering wheel to a wheel, the steering clearance may include a first sub-clearance caused by a defect in a first coupling section, and a second sub-clearance caused by a defect in a second coupling section, and the detected current section may include a first current section that is detectable due to a change in the control current occurring due to a first load group corresponding to the first sub-clearance, a second current section that is detectable due to a change in the control current occurring due to a second load group corresponding to the second sub-clearance, and a third current section that is detectable due to a change in the control current occurring due to a third load group including remaining components among the components of the steering system that constitutes the entire coupling section from the steering wheel to the wheel in the agricultural machine.

In one embodiment, the determining of the compensation angle for the steering clearance based on the rotation angle of the steering wheel in the current section in which the change in steering angle of the wheel occurs may include searching for the value of the rotation angle of the steering wheel at a time point at which a current starts to rise in the current section in which the change in steering angle of the wheel occurs, and determining the found rotation angle of the steering angle to be the compensation angle for the steering clearance in one direction.

In one embodiment, the method may further include verifying the compensation angle based on GPS information of the agricultural machine; and setting the compensation angle to a value of the compensation angle that is successfully verified.

The verifying of the compensation angle may include rotating the steering wheel at a rotation angle exceeding the determined compensation angle in one direction while the agricultural machine travels for a certain verification time, and after the steering wheel rotates at the rotation angle exceeding the compensation angle, checking whether a wheel rotates at a steering angle corresponding to a difference angle between the rotation angle exceeding the compensation angle and the compensation angle.

A computer-readable recording medium according to another aspect of the present disclosure may record a program for performing the method of presetting a compensation angle for a steering clearance according to the above-described embodiments.

An autonomous agricultural machine according to still another aspect of the present disclosure includes an autonomous driving device in which a compensation angle for the steering clearance is set by the method of presetting a compensation angle for a steering clearance, wherein the autonomous agricultural machine is provided such that a target steering angle for driving the agricultural machine along on an autonomous driving route is obtained, a first rotation angle of the steering wheel corresponding to the target steering angle is calculated using a steering ratio of the agricultural machine, the compensation angle is applied to the calculated first rotation angle of the steering wheel to calculate a second rotation angle of the steering wheel, a rotation instruction having the second rotation angle of the steering wheel is generated and transmitted to the driving unit, and the driving unit controls the steering control motor based on a control signal according to the rotation instruction to rotate the steering wheel by the second rotation angle.

In one embodiment, a target steering direction is a right direction, the second rotation angle is calculated through the following equation.

$$\text{Steer\_CtrlAng} = (\text{Steer\_TgtAng} + B) - \text{Steer\_CurAng}. \quad \text{[Equation]}$$

Here, Steer_CtrlAng denotes the second rotation angle, B denotes a value of a right compensation angle) (B°), Steer_CurAng denotes a current position of the steering wheel before the target steering direction and the target steering angle are received, and the current position of the steering wheel is expressed as a rotation angle by which the steering wheel rotates from the reference state.

When the target steering direction is a left direction, the second rotation angle is calculated through the following equation.

$$\text{Steer\_CtrlAng} = (\text{Steer\_TgtAng} - A) - \text{Steer\_CurAng}. \quad \text{[Equation]}$$

Here, −A denotes a value of a left compensation angle (−A°).

According to various embodiments of the present disclosure, in consideration of a structural error of an agricultural machine, a rotation angle of a steering wheel is calculated through a steering ratio from a target steering angle of a user placed in a remote place, thereby providing more accurate driving performance.

The effects obtainable in the present disclosure are not limited to the effects described above, and other effects that are not described will be clearly understood by a person skilled in the art from the description below.

BRIEF DESCRIPTION OF THE DRAWINGS

Reference will now be made to the accompanying drawings, which are not necessarily drawn to scale, and wherein.

DETAILED DESCRIPTION

Figure 1:
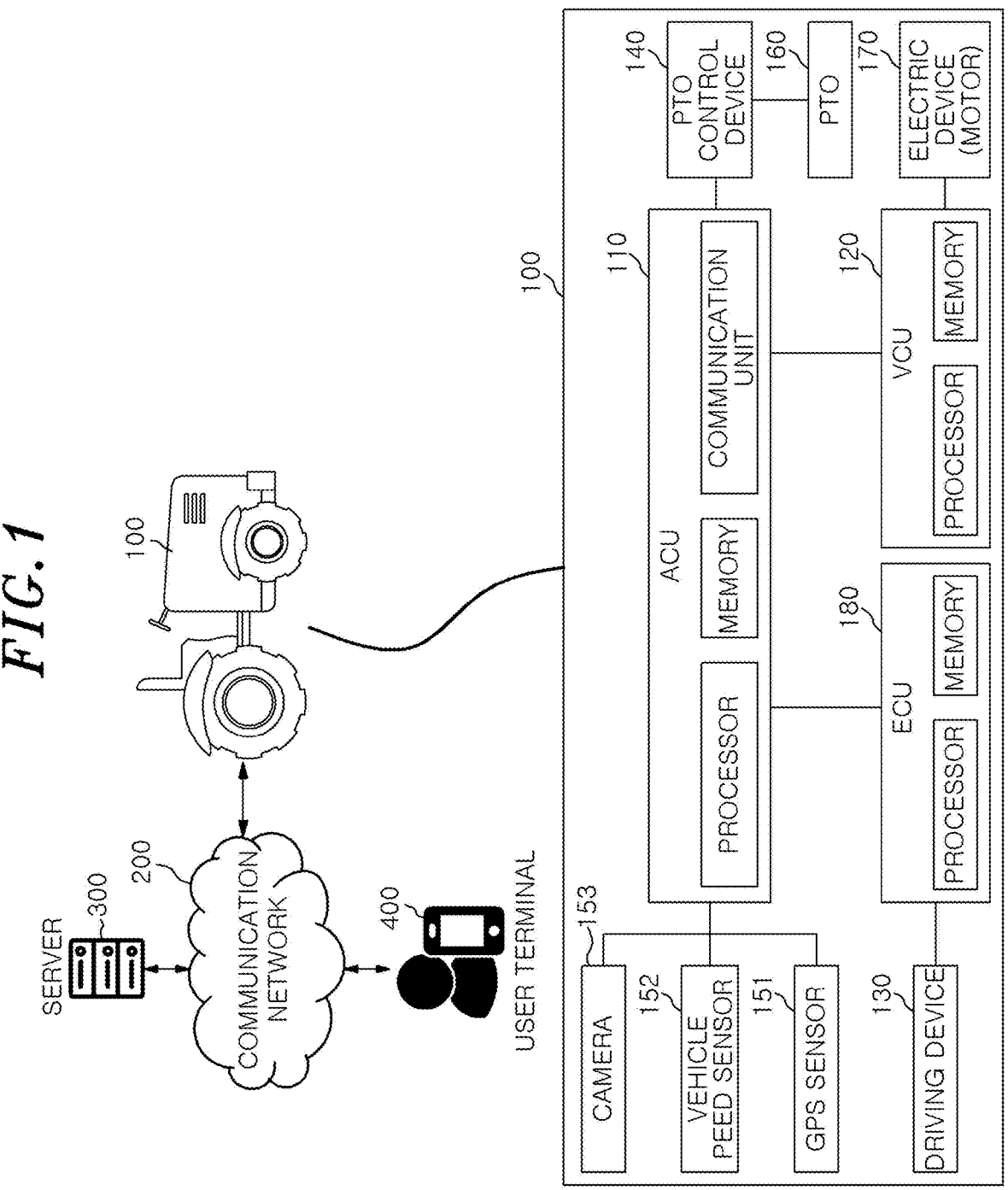
FIG. 1 illustrates a network environment in which an autonomous agricultural machine operates according to one aspect of the present disclosure.

Terms used in the present disclosure are merely used to describe specific embodiments and may not be intended to limit the scope of other embodiments. An expression of a singular number may include an expression of the plural number, so long as does not clearly indicate otherwise. Terms including technical or scientific terms used herein may have the same meanings as generally understood by those skilled in the art described in the present disclosure. Among the terms used in the present disclosure, terms generally defined in dictionaries may be interpreted as having the same or similar meanings as or to contextual meanings of related technology. Unless otherwise defined herein, the terms should not be interpreted with ideally or excessively formal meanings. When needed, even the terms defined in the present disclosure may not be interpreted as excluding embodiments of the present disclosure.

Agricultural machines are treated as very important elements to reduce the high labor burden and production costs in response to labor shortages due to the decline and aging of the working population in rural areas.

As used herein, agricultural machines are for performing a variety of work necessary for farming and enables various types of work such as plowing work, rotary work, pest control work, and transplanting work and are divided into walk-behind work apparatuses in which a worker operates the agricultural machine while walking along with the agricultural machine, and riding-type work apparatuses in which a worker sits on a driver's seat provided on the agricultural machine and operates the agricultural machine.

Various embodiments of the present disclosure disclose a device applicable to an agricultural machine which is classified as a riding-type work apparatus such as a tractor.

The agricultural machine may be combined with a working device to perform work on agricultural land such as a rice paddy or field. The traveling of the agricultural machine involves such agricultural work.

A user of the agricultural machine may perform manual driving control in person. The user of the agricultural machine may manipulate a shuttle lever of the agricultural machine in person to control the forward or rearward movement of the agricultural machine and may manipulate a steering wheel to control a route of the agricultural machine.

In addition, for autonomous driving of the agricultural machine, a driving control device for controlling forward or rearward driving may be installed on the agricultural machine. In this case, the agricultural machine may move along a set route and move forward or rearward according to a setting of the user of the agricultural machine. Autonomous driving may be controlled and set through information exchange between the driving control device installed on the agricultural machine and a user device. By using a user device such as a smartphone or computer which is a terminal capable of performing information calculations and transmitting or receiving information, the user may generate autonomous driving-related setting information and transmit the generated autonomous driving-related setting information to the driving control device. The driving control device includes a transceiver and a processor and is electrically connected to a driving unit of the agricultural machine to control the driving unit. The driving control device may receive the autonomous driving-related setting information from the user device and control the forward or rearward movement of the driving unit of the agricultural machine according to the setting information related to autonomous driving.

For autonomous driving of the agricultural machine, a steering wheel control device for controlling the steering wheel may be installed on the agricultural machine. In this case, the steering wheel control device may be configured to control the steering wheel such that the agricultural machine may move along a set route according to the autonomous driving-related setting information received from the user device. The steering wheel control device may be mechanically connected to the steering wheel and configured to rotate the steering wheel according to a set route. The steering wheel control device may include a transceiver to receive the autonomous driving-related setting information from the user device. The steering wheel control device may include a processor and control the rotation of the steering wheel according to the autonomous driving-related setting information.

In the present specification, a reference state of the steering wheel is a state in which the agricultural machine moves straight. When there is no error in the coupling in a steering system, an initial state in which the steering wheel does not rotate is the reference state of the steering wheel.

In the present specification, steering a wheel refers to rotating the wheel to change a traveling direction of the agricultural machine. The steering of the wheel is distinguished from rotating the wheel along a wheel shaft to move the agricultural machine forward or rearward.

FIG. 1 illustrates a network environment in which an autonomous agricultural machine operates according to one aspect of the present disclosure.

Referring to FIG. 1, the network environment includes an autonomous agricultural machine 100, a communication network 200, a server 300, and a user terminal 400.

The agricultural machine 100 includes an automated-driving control unit (ACU) 110, a vehicle control unit (VCU) 120, a Global Positioning System (GPS) sensor 151, and a driving speed sensor 152. In addition, in some embodiments, the agricultural machine 100 may further include one or more components of a driving device 130, a power takeoff (PTO) control device 140, a camera 153, a PTO 160, an electric device 170, and an electronic control unit (ECU) 180.

The GPS sensor 151 is configured to recognize a GPS position of the agricultural machine 100. The GPS sensor 151 receives signals transmitted from three or more GPS satellites and determines positions of the satellites and the GPS sensor 151. By measuring a time difference between the signal transmitted from the GPS satellite and the signal received from the GPS sensor 151, a distance between the GPS satellite and the GPS sensor 151 may be obtained. In this case, the signal transmitted from the GPS satellite may include information about the position of the GPS satellite.

When distances to three or more GPS satellites and the position of each GPS satellite are known, the position of the GPS sensor may be calculated using a method including trilateration or the like. The GPS position of the agricultural machine 100 may be determined using the GPS sensor 151.

The driving speed sensor 152 is installed to measure a rotational speed of a wheel shaft coupled to a wheel of the agricultural machine 100. The driving speed sensor 152 may measure a driving direction and a driving speed by detecting a rotation direction and a rotation angle of the wheel shaft. For example, a specific rotation direction may be measured as a forward direction, and a direction opposite to the specific rotation direction may be measured as a rearward direction.

The ACU 110 may be configured to receive autonomous driving-related information of the agricultural machine 100 from the user terminal 400 or server 300 and control the operation of the agricultural machine 100 in relation to autonomous driving. In some embodiments, the ACU 110 may include a processor, a memory, and a communication unit.

The ACU 110 may determine an autonomous driving route of the agricultural machine 100 and determine driving operation and steering control according to the autonomous driving route of the agricultural machine 100. The ACU 110 may be configured to transmit a control signal to the VCU 120, the PTO control device 140, the GPS sensor 151, the driving speed sensor 52, the camera 153, and the ECU 180 in relation to autonomous driving of the agricultural machine 100 and receive information according to the performance of the controlled operation from the VCU 120, the PTO control device 140, the GPS sensor 151, the driving speed sensor 152, the camera 153, and the ECU 180.

In particular embodiments, the ACU 110 may receive GPS information to acquire a position of the agricultural machine 100. In addition, the ACU 110 may calculate driving-related information of the agricultural machine 100 based on the GPS information. The driving-related information may include at least one of a driving direction and a driving speed according to a measurement time of the GPS satellite.

In addition, the ACU 110 may obtain driving speed information of the agricultural machine 100 from the driving speed sensor 152. The driving speed information may include a speed value at a measurement time or a driving speed value that is a combination of a speed value and a driving direction.

The VCU 120 may control various electric devices 170 in the agricultural machine 100. In some embodiments, the VCU 120 may include a processor and a memory.

The electric device 170 may include a steering device such as motor, a transmission, a user interface device, and the like.

In the certain embodiments, the steering device includes a steering control motor that changes a steering angle of a steering wheel. The steering control motor is used as the electric device 170.

The steering control motor 170 is configured to rotate the steering wheel such that a rotational force of the steering wheel is transmitted to the wheel. When the steering control motor is driven to rotate the steering wheel, a rotational force of the steering wheel is transmitted to the wheel through various links and gears in the steering system connected to the steering wheel. Here, power of the steering control motor is proportional to a rotational force to be transmitted to the wheel.

The VCU 120 may control various electric devices 170 in the agricultural machine 100 according to an autonomous driving instruction of the ACU 110. For example, the VCU 120 may receive a steering instruction for the steering wheel from the ACU 110. The steering instruction includes an absolute value of a steering angle and a steering direction. In some embodiments, the steering direction may be preset as positive and negative steering angle values. For example, a steering direction for driving the agricultural machine rightward may be preset as a positive angle, and a steering direction for driving the agricultural machine 100 leftward may be preset as a negative angle. Then, the VCU 120 obtains a steering direction based on a sign of a steering angle in the steering instruction and generates a control signal for the steering wheel based on an absolute value of the steering angle in the steering instruction and the steering direction to transmit the generated control signal to a steering control motor 170. In particular embodiments, the control signal of the VCU 120 may be in the form of a current. The VCU 120 may control a current supply of the steering control motor 170 to adjust a rotation direction and a rotation angle of the steering wheel.

Then, the steering control motor 170 is driven according to the control signal to cause the steering wheel to rotate at a target steering angle.

In this way, from the standpoint of a device (for example, the ACU 110) for controlling the steering control motor 170, the steering wheel, various links and gears in the steering system, a tire size, a vehicle weight, and characteristics of an outdoor space (for example, whether the outdoor space is a flatland, a rice paddy, or a field) serve as loads of the steering control motor 170.

When the load of the steering control motor is relatively small, since relatively little power is required to transmit a rotational force of the steering wheel to the wheel, current consumption required by the steering control motor may be relatively low. On the other hand, when the load of the steering control motor is relatively large, since relatively much power is required to transmit the rotational force of the steering wheel to the wheel, current consumption required by the steering control motor may be relatively high.

In addition, the electric device 170 may include an input device (for example, a joystick or a touch display panel) that receives control input from an occupant. The input device may also be referred to as an occupant operation device. The occupant operation device is connected to the VCU device 120 to allow an occupant to input a signal for controlling the agricultural machine.

In the agricultural machine 100 including the input device, the VCU 120 may receive an occupant signal, with which an occupant controls the agricultural machine, through various input devices in the agricultural machine 100 and control another electric device 170 or ECU 180 based on the received occupant signal.

In addition, in some embodiments, the ACU 110 may be configured to perform a vision recognition autonomous driving operation using an image captured by the camera 153. The camera 153 is configured to capture an image of objects in front. The camera 153 may be configured to photograph objects in front of or around the agricultural machine. In addition, the camera 153 may be configured to photograph people or objects around the agricultural machine. A plurality of cameras 153 may be installed to photograph objects positioned in a moving direction of the agricultural machine 100 (for example, a forward, rearward, or lateral direction) or around the agricultural machine 100 for autonomous driving of the agricultural machine 100.

In this case, the ACU 110 may perform an autonomous driving operation more autonomously based on a vision recognition result without the intervention of an external user.

In particular embodiments, the ACU 110 and the VCU 120 may also be integrated into a single device. In this case, the single device may perform the operations of both the VCU 120 and the ACU 110. In the present specification, the single device that performs the operations of both the VCU and ACU may be referred to as an autonomous driving device.

The ACU 110 and VCU 120 of FIG. 1 will be described in more detail with reference to an autonomous driving device of FIG. 2 into which the ACU 110 and VCU 120 are integrated.

The driving device 130 corresponds to an engine of the agricultural machine 100. The driving device 130 may operate or stop under the control of the ECU device 180. The driving device 130 may be a diesel engine, another internal combustion engine, or an electric motor.

The ECU device 180 is electrically connected to the driving device 130, that is, the engine, of the agricultural machine 100. The ECU device 180 may control the driving device 130 of the agricultural machine 100 to operate or stop.

The ECU device 180 is built into the agricultural machine 100 and is configured to control various components inside the agricultural machine in a wired manner. The ECU device 180 may perform engine control and transmission control operations, and other control operations. A driver may smoothly use the agricultural machine 100 through the ECU device 180.

The ECU 180 may control the driving device 130 or the like by receiving a control signal of the ACU 110 or a control signal input by an occupant through the VCU 120. The ACU 110 and the VCU 120 may transmit a control signal for driving or stopping the driving device 130 to the ECU 180. When a control signal is transmitted from the ACU 110 to the ECU 180, the control of the driving device is determined according to autonomous driving without the determination of an occupant, and a control signal is transmitted. When a control signal is transmitted from the VCU 120 to the ECU 180, the control of the driving device is determined according to the occupant's control, and a control signal is transmitted.

The PTO control device 140 may control the PTO to operate or stop. The PTO control device 140 may control the operation of the PTO by turning power supplied to the PTO on or off.

The PTO 160 is a device for transmitting a rotational force of the driving device 130 in the agricultural machine 100, that is, a rotational force of the engine, to a work apparatus connected to the agricultural machine 100 for agricultural work. The PTO 160 allows the work apparatus to perform work operations using external power without its own motor. There are various types of work apparatuses that can be connected to the PTO (160).

The agricultural machine 100 may perform agricultural work or civil engineering work while towing the work apparatus. The agricultural machine 100 may provide a strong tractive force to tow heavy objects and provide a plurality of shift stages to perform a variety of work. For example, the agricultural machine 100 may be a tractor. In addition, the work apparatus may include tools that perform a variety of agricultural work, such as, for example, a spade, a plow or plough, a harrow, a rake, a rotavator, and a harvester. According to types of the work apparatuses coupled to the agricultural machine 100, the agricultural machine 100 may perform a variety of agricultural work such as tillage work, harrow work, disease and pest control work, pumping work, and threshing work.

The server 300 is a server operated by a manufacturer of the agricultural machine 100 or an autonomous driving-based service provider. The server 300 is an electronic device that may transmit autonomous driving-related information of the agricultural machine 100 to the agricultural machine 100 and the user terminal 400 through the communication network 200 and may receive information from the agricultural machine 100 and the user terminal 400 through the communication network 200.

In particular embodiments, the server 300 may be a unitary server or may be a distributed server spanning a plurality of computers or a plurality of data centers. In some embodiments, the server 300 is a computer system and computer software (network server programs) that are connected to a sub-device, which is capable of communicating with other network servers through a computer network such as a private intranet or the Internet, to receive a request for performing work, perform work according to the request, and provide a performance result. However, the server 300 should be understood as a broad concept that includes, in addition to the network server program, a series of application programs running on a server and, in some cases, various databases built therein. The server 300 may be of various types, such as, for example and without limitation, a web server, a news server, a mail server, a message server, an advertising server, a file server, an application server, an exchange server, a database server, a proxy server, another server suitable for performing functions or processes described herein, or any combination thereof. In particular embodiments, each server 300 may include hardware, software, or embedded logic elements, or a combination of two or more such elements to perform appropriate functions implemented or supported by the server 300.

The user terminal 400 is a terminal operated by a user of the agricultural machine 100. The user terminal 400 is an electronic device that may transmit or receive information to or from the agricultural machine 100 or the server 300 through the communication network 200.

A user may transmit or receive information to or from the agricultural machine 100 or the server 300 using a plurality of user terminals.

In particular embodiments, the user terminal 400 is a computing system that includes hardware, software, or embedded logic components, or a combination of two or more such components and is capable of performing appropriate functions implemented or supported by the electronic device 400. The electronic device 400 may include, for example, a computer system such as a desktop computer, a laptop computer, a netbook, a tablet computer, an e-book reader, a GPS device, a camera, a personal digital assistant (PDA), a portable electronic device, a cellular telephone, a smartphone, another suitable electronic device, or any suitable combination thereof.

Figure 2:
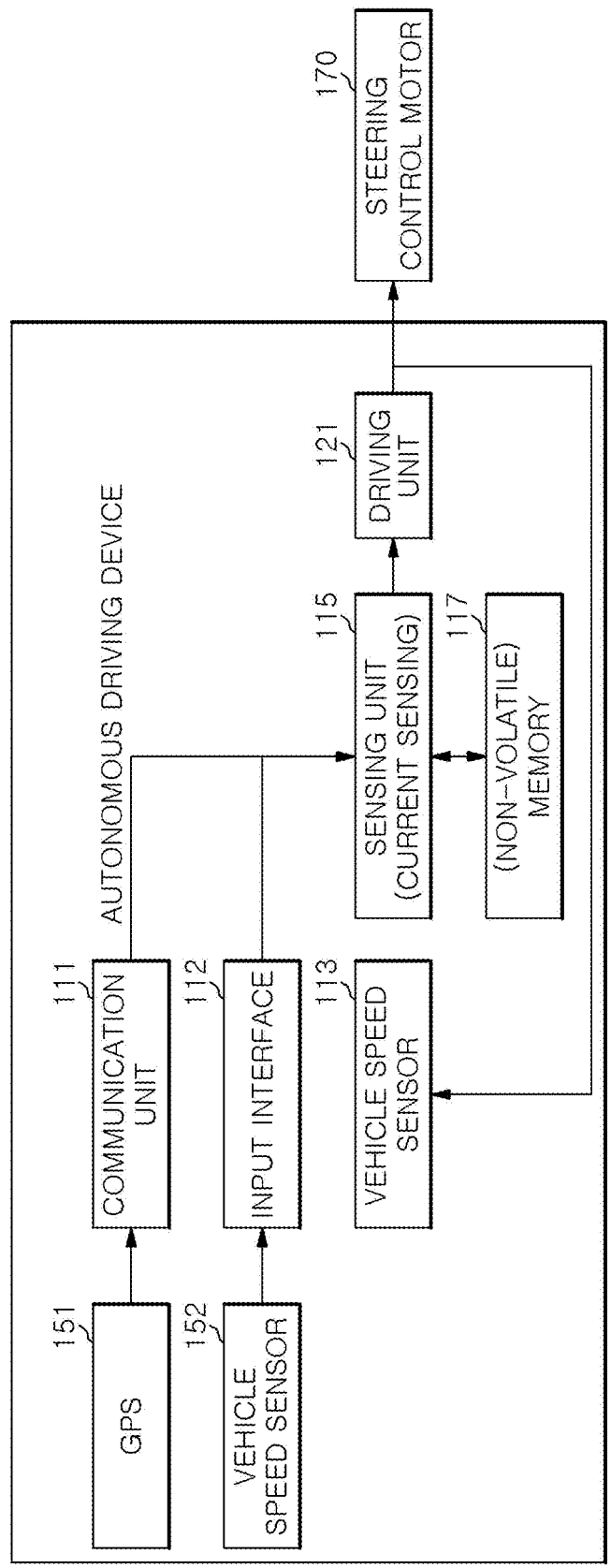
FIG. 2 is a schematic diagram of an autonomous driving device including a vehicle control unit (VCU) and an automated-driving control unit (ACU) according to various embodiments of the present disclosure.

FIG. 2 is a schematic diagram of the autonomous driving device including the VCU and the ACU according to various embodiments of the present disclosure.

Referring to FIG. 2, the autonomous driving device includes a GPS communication unit 111, a current sensor 113, a calculation unit 115, a memory 117, and a driving unit 121. In some embodiments, the autonomous driving device may further include an input interface 112.

The autonomous driving device may also include components of the ACU 110 and components of the VCU 120.

For example, when the operation of the autonomous driving device in FIG. 2 is implemented using the separate ACU 110 and the VCU 120, the ACU 110 may include components 111, 112, 113, 115, and 117 for performing an autonomous driving-related calculation or control operation of the autonomous driving device, and the VCU 120 may include a component 121 for performing an autonomous driving-related driving operation of the autonomous driving device.

The communication unit 111 may be a GPS communication unit 111 that communicates with GPS satellites. The GPS communication unit 111 may receive GPS information and transmit the received GPS information to the calculation unit 115. The communication unit 111 may receive a target steering direction information and a target steering angle information for traveling along autonomous driving route from server 300 or terminal 400.

The input interface 112 may be electrically connected to other autonomous driving devices or the ACU 110 in the agricultural machine 100 and/or electrically connected to the driving speed sensor 152 in a wired or wireless manner. For example, the input interface 112 is coupled to a processor and transmits and/or receives a signal. The input interface 112 may be connected to another communication unit referred to as a transmitter, a receiver, or a transceiver. The other communication unit supports at least one of various wireless communication standards such as an Institute of Electrical and Electronics Engineers (IEEE) 802.xx system, an IEEE Wi-Fi system, a $3^{rd}$ Generation Partnership Project (3GPP) system, a 3GPP Long Term Evolution (LTE) system, a 3GPP 5G New Radio (NR) system, a 3GPP2 system, and Bluetooth which are wired access systems and wireless access systems.

For reference, the GPS communication unit 111 may also be a transmitter, a receiver, or a transceiver that performs electronic communication using a protocol specialized for communication with the GPS satellites.

The input interface 112 may receive a control signal from another autonomous driving device or the ACU 110 in the agricultural machine 100 in a wired or wireless manner or may receive a sensor signal obtained by measuring a driving speed of the agricultural machine 100 from the driving speed sensor 152 and transmit the received signal to the calculation unit 115.

The current sensor 113 detects a change in current value that occurs when the steering control motor 170 is driven. When the driving unit 121 supplies a control signal in the form of a current (hereinafter, "control current") to drive the steering control motor 170, the current sensor 113 may measure the control current supplied to the steering control motor 170 to transmit the measured control current to the calculation unit 115.

The calculation unit 115 may include a processor. The processor may be configured to implement procedures and/or methods proposed in the present disclosure. The processor controls the overall operations of the autonomous driving device. For example, the processor transmits or receives information or the like through the communication unit 111. In addition, the processor writes and reads data to and from the memory 117. The calculation unit 115 may include at least one processor.

The calculation unit 115 may obtain a position of the agricultural machine 100 based on GPS information received through the GPS communication unit 111. In addition, the calculation unit 115 may calculate driving-related information of the agricultural machine 100 based on GPS information and/or driving speed information. The driving-related information may include driving direction or driving speed information in a driving area. In the driving direction or speed information, a driving direction and a driving speed may be expressed in combination with geographical information. For example, a position of the agricultural machine 100 expressed in longitude and latitude may be obtained from GPS information, and the calculation unit 115 may use pre-stored geographical information (for example, map information) to display the position of the agricultural machine 100 on a map and express the position as a relative position with respect to other places or objects on the map. In addition, the driving direction or driving speed of the agricultural machine 100 may be expressed as a relative direction or speed with respect to other places or objects on the map.

In addition, the calculation unit 115 obtains a measurement result of a control current for controlling a steering angle of the steering wheel supplied to the steering control motor 170 based on a sensor signal received through the input interface 112. The measurement result includes a measured value of the control current. In addition, the measurement result may further include a time at which the measurement value is measured. Then, the measurement result may be used to implement a graph of a control current change according to time.

The calculation unit 115 is configured to process an autonomous driving-related operation of the agricultural machine 100. The calculation unit 115 may generate a control instruction for autonomous driving according to a driving guide received from the server 300 or the user terminal 400 and transmit the generated control instruction to the VCU 120.

In addition, before generating the control instruction for autonomous driving according to the driving guide, the calculation unit 115 may generate a control instruction for setting a compensation angle for a steering clearance and transmit the generated control instruction to the VCU 120. For example, the calculation unit 115 may generate a control instruction for gradually rotating the steering wheel to a rightward direction or a leftward direction and transmit the generated instruction to the driving unit 121.

The memory 117 may be provided as a volatile memory, a non-volatile memory, or a combination of a volatile memory and a non-volatile memory. The memory 117 stores a command for operating the calculation unit 115 or an operation result of the calculation unit 115. In addition, the memory 117 stores a compensation angle for a steering clearance obtained using the calculation unit 115 and the driving unit 121 below. The memory 117 may provide stored data (for example, a compensation angle) according to a request of the calculation unit 115.

The driving unit 121 may control the steering control motor 170 according to a control instruction of the calculation unit 115 such that the agricultural machine 100 moves to a target position. For example, the driving unit 121 may control the steering control motor 170 according to a control instruction for setting a compensation angle for a steering clearance.

The operation of the autonomous driving device of FIG. 2, which performs autonomous driving more accurately at a rotation angle of the steering wheel corrected by setting a compensation angle mainly using the calculation unit 115 and the driving unit, and applying the set compensation angle, will be described in more detail with reference to FIGS. 5 to 8 below.

For a more accurate understanding of the setting of the compensation angle for a steering clearance, first, a steering clearance will be described in more detail.

Figure 3:
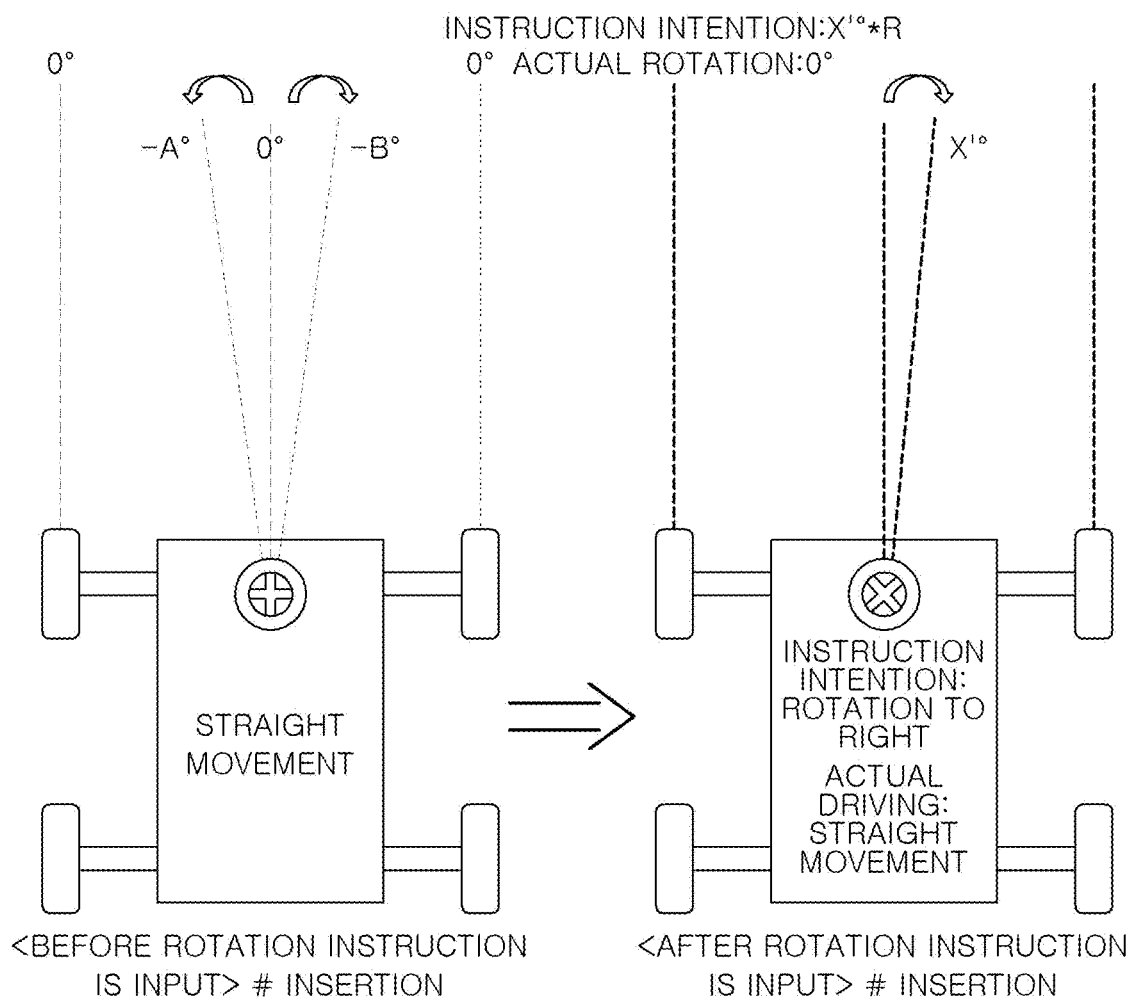
FIG. 3 illustrates a relationship between the rotation of a steering wheel and the steering of a wheel in an agricultural machine having a steering clearance.
Figure 4:
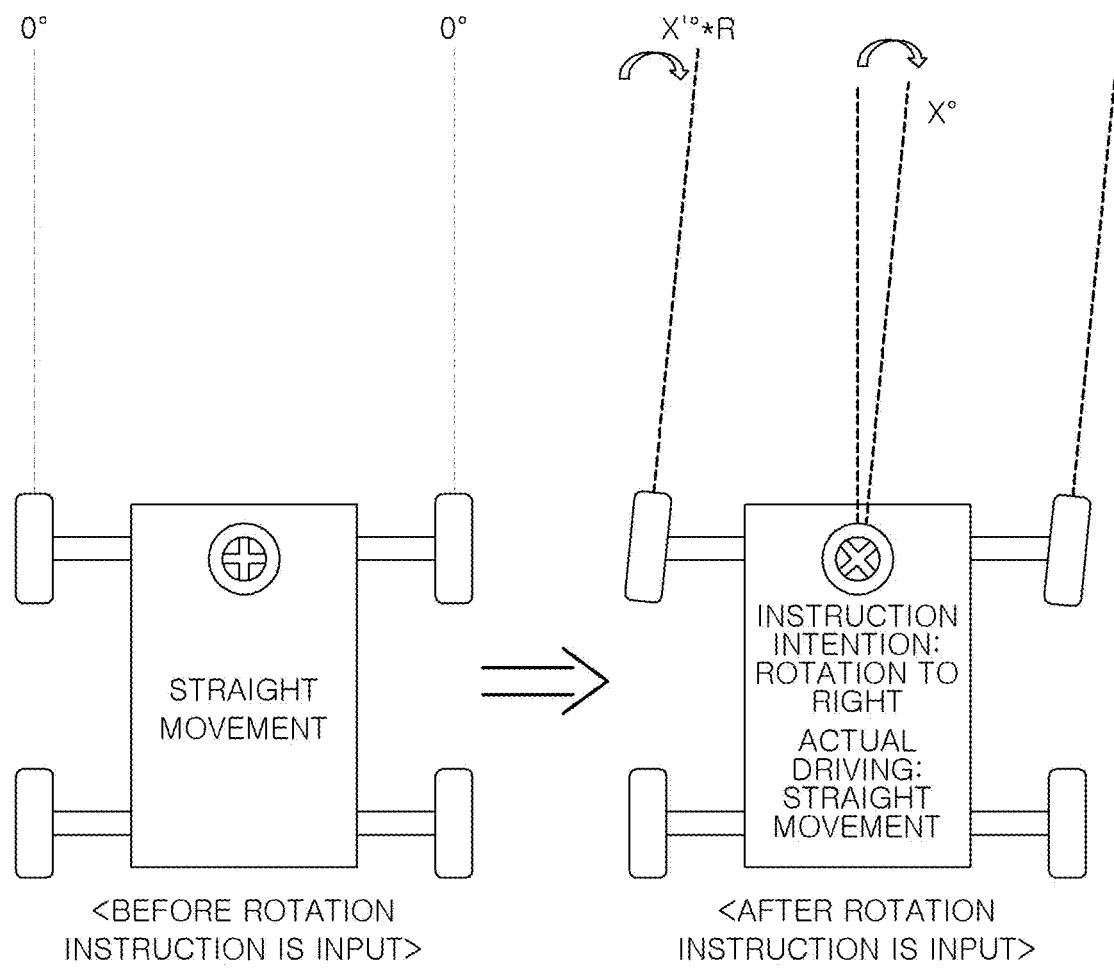
FIG. 4 illustrates a relationship between the rotation of a steering wheel and the steering of a wheel in an agricultural machine having no steering clearance.

FIG. 3 illustrates a relationship between the rotation of a steering wheel and the steering of a wheel in an agricultural machine having a steering clearance. FIG. 4 illustrates a relationship between the rotation of a steering wheel and the steering of a wheel in an agricultural machine having no steering clearance.

The steering system of the agricultural machine 100 has a configuration in which, when the steering wheel rotates under the control of a control motor in the autonomous agricultural machine 100, a rotational force of the steering wheel is transmitted to the wheel through various links/gears between the steering wheel and the wheel. That is, the rotation of the steering wheel causes the rotation of the wheel. The steering system is configured to have a proportional relationship between a steering angle of the steering wheel and a steering angle of the wheel as shown in the following equation.

steering angle of wheel:  [Equation 1]

rotation angle of steering wheel = 1:$R$.

Here, $R$ denotes a steering ratio of the agricultural machine 100. The steering ratio $R$ may be designed to have a value of $0 < R < 1$.

In the agricultural machine 100, when a rotation instruction for the steering wheel is input for autonomous driving, the steering wheel rotates by a rotation angle in the instruction. The rotation instruction may be generated according to a value calculated by the ACU 110 itself or may be an instruction received from the server 300 or the user terminal 400.

As described above, the steering clearance is due to a defect in a coupling structure of various components of the steering system which connect the steering wheel and the wheel. Due to the steering clearance, a rotational force of the steering wheel is not immediately transmitted to the wheel. Within a range of the steering clearance, even when the steering wheel rotates, since there is no effect on other steering systems, it may be considered that there is a clearance in a coupling between the steering wheel and components of other steering systems (for example, a clearance between the steering wheel and a steering shaft or a clearance between the steering shaft and other links or the like).

When the steering wheel rotates within the range of the steering clearance, a rotational force of the steering wheel is not transmitted to the wheel, and thus the rotation of the steering wheel is not synchronized with the rotation of the wheel. For example, as shown in FIG. 3, the agricultural machine 100 has a steering clearance ranging from a reference state to A° to the left and from the reference state to B° to the right. In this case, the steering clearance may be expressed as a range from −A° to B°. Here, A and B may be positive numbers.

When the steering wheel rotates within the range of the steering clearance, the wheel does not actually rotate and moves straight. For example, when a rotation instruction having a rotation angle X', wherein −A<X'<B, is input to the autonomous driving device installed on the agricultural machine 100 of FIG. 3, even when the steering wheel rotates by the rotation angle X', due to the steering clearance, a rotational force is not transmitted to the wheel, and thus the wheel does not actually rotate. As a result, a driving direction of the agricultural machine 100 does not rotate by the intended steering angle R'×R of the rotation instruction, and the agricultural machine 100 moves straight as shown in FIG. 3.

When the steering wheel rotates beyond the range of the steering clearance, a rotational force of the steering wheel is transmitted to the wheel, and the wheel rotates. When the steering wheel rotates to the right, the wheel rotates by (X'−B)×R, and when the steering wheel rotates to the left by X' wherein X'>A, the wheel rotates by (X'−A)×R.

On the other hand, when there is no steering clearance in the agricultural machine 100, while the steering wheel rotates by the rotation angle in the instruction, a rotational force is transmitted to the wheel without any change, and thus the wheel actually rotates by a steering angle of the wheel corresponding to the rotation angle of the steering wheel. Here, the steering angle of the wheel corresponding to the rotation angle of the steering wheel is calculated according to Equation 1.

For example, when a driving direction of the agricultural machine 100 should be changed by X×R in order for the agricultural machine 100 to autonomously travel along a desired route, a rotation instruction having a rotation angle X for causing a steering angle X×R is input to the autonomous driving device installed on the agricultural machine 100 of FIG. 4. Then, since there is no steering clearance, while the steering wheel rotates by the rotation angle X, a rotational force is transmitted to the wheel without any change so that the wheel actually rotates by X×R. When an occupant of the agricultural machine 100 rotates the steering wheel by an angle of 100°, the wheel rotates by 100×R.

That is, as shown in FIG. 4, when there is no steering clearance, synchronization between the rotation of the steering wheel and the rotation of the wheels according to Equation 1 may be accurately implemented, and thus the agricultural machine 100 may accurately perform desired autonomous driving.

Therefore, in the case of the agricultural machine 100 having a steering clearance, before the steering wheel is rotated using a rotation angle in a rotation instruction without any change, a rotation angle, which is obtained by correcting the rotation angle in the rotation instruction in consideration of a steering clearance, needs to be input to the driving unit 121. That way, the driving unit 121 may generate a control signal for steering the wheel at a steering angle intended through a rotation instruction and transmit the generated control signal to the steering control motor 170, and the steering control motor 170 may be driven according to the control signal to rotate the steering wheel at a rotation angle that causes the intended steering angle of the rotation instruction. As a result, the wheel actually rotates at the intended steering angle of the rotation instruction.

To this end, before autonomous driving of the agricultural machine 100, the autonomous driving device performs a presetting operation of calculating a compensation angle for a steering clearance and storing the compensation angle by using the calculation unit 115 and the driving unit 121.

Figure 5:
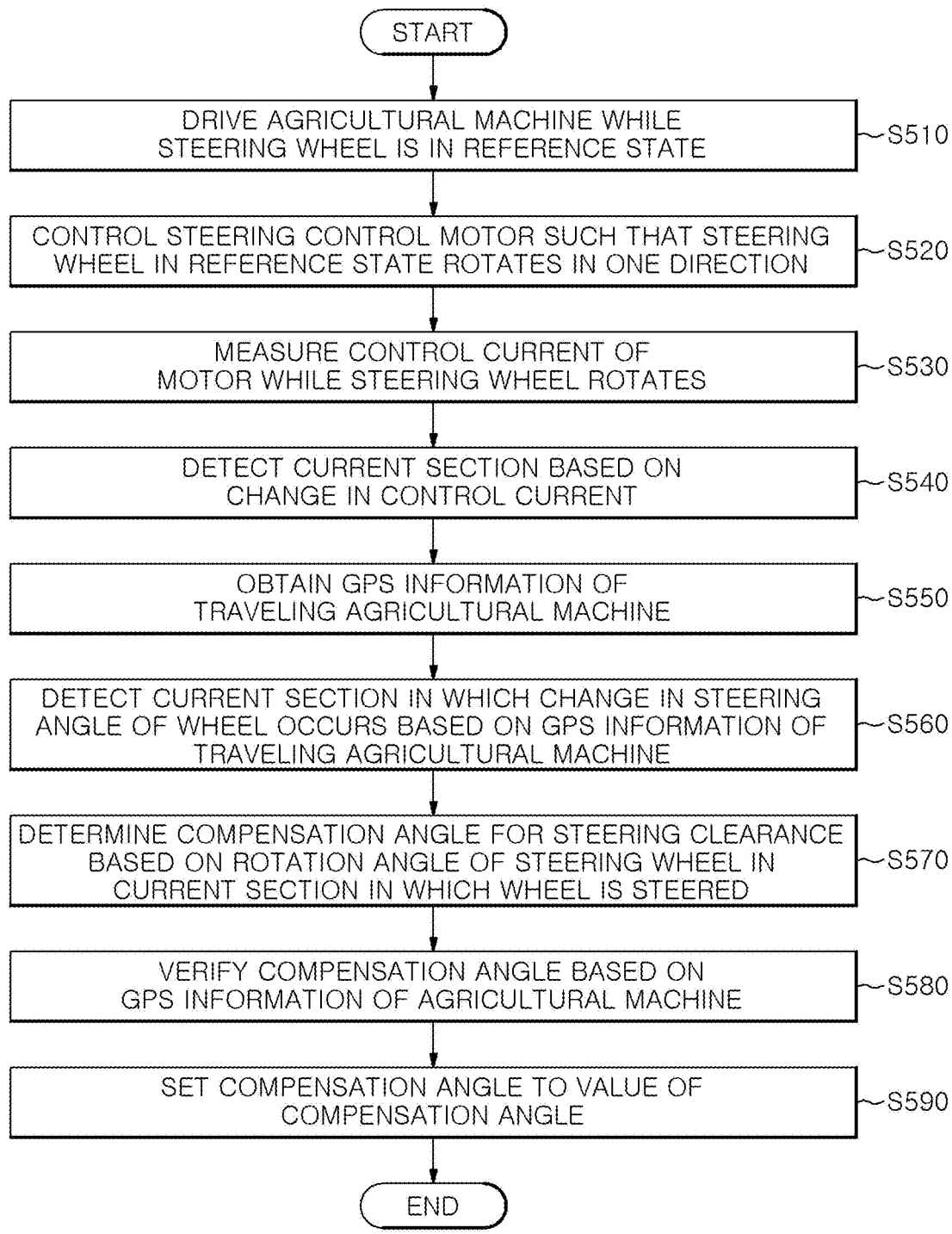
FIG. 5 is a flowchart of a method of setting a compensation angle for a steering clearance according to another aspect of the present disclosure.

FIG. 5 is a flowchart of a method (also referred to as "presetting operation") of presetting a compensation angle for a steering clearance according to another aspect of the present disclosure.

Referring to FIG. 5, the presetting operation includes operation S510 of driving the agricultural machine 100 while the steering wheel is in a reference state through the calculation unit 115 and the driving unit 121, operation S520 of supplying a control current to the steering control motor 170 such that the steering wheel in the reference state rotates in one direction, operation S530 of receiving, by the calculation unit 115, a measurement result of the control current from the current sensor 113, and an operation of determining a compensation angle for a steering clearance based on a current measurement result of the control signal received from the current sensor 113.

In operation S510, after the steering wheel is positioned in the reference state, the agricultural machine 100 starts to travel. In some embodiments, the agricultural machine 100 may travel at a preset speed for the presetting operation.

As described above, a range of a steering clearance may be defined as a rotation angle of the steering wheel in a right direction and a steering rotation angle in a left direction. In operation S520, the steering wheel is rotated in the right direction to calculate a compensation angle for a steering clearance in the right direction, or the steering wheel is rotated in the left direction to calculate a compensation angle for a steering clearance in the left direction. The rotation of the steering wheel is performed while the agricultural machine 100 travels in operation S510.

In operation S520, the calculation unit 115 generates a rotation instruction for setting the compensation angle and transmits the rotation instruction for setting the compensation angle to the driving unit 121. The rotation instruction is an instruction for rotating the steering wheel. The rotation instruction for setting the compensation angle has an instruction value for gradually increasing a rotation angle of the steering wheel. For example, the rotation instruction for setting the compensation angle may have a constant rotation speed or may include a set of rotation angle values that sequentially increase over time. The set may consist of values (t1, _1), (t2, _2), ..., and (tn, _n), where tn denotes a sample driving time for a pre-compensation operation, and n denotes an index of a unit time. Here, _n>_n−1. In some examples, a value of a rotation angle in the set may be set to satisfy a relationship _n−_n−1=_const, but the present disclosure is not limited thereto.

In operation S520, the driving unit 121 generates a control signal for rotating the steering wheel according to the rotation instruction for setting the compensation angle and transmits the control signal for rotating the steering wheel to the steering control motor 170. The control signal may be supplied in the form of a current.

In operation S530, the current sensor 113 measures the control current supplied to the steering control motor 170 and transmits the measurement result to the calculation unit 115. In operation S530, the calculation unit 115 may receive a measurement result that may represent a graph of FIG. 6 below.

Figure 6:
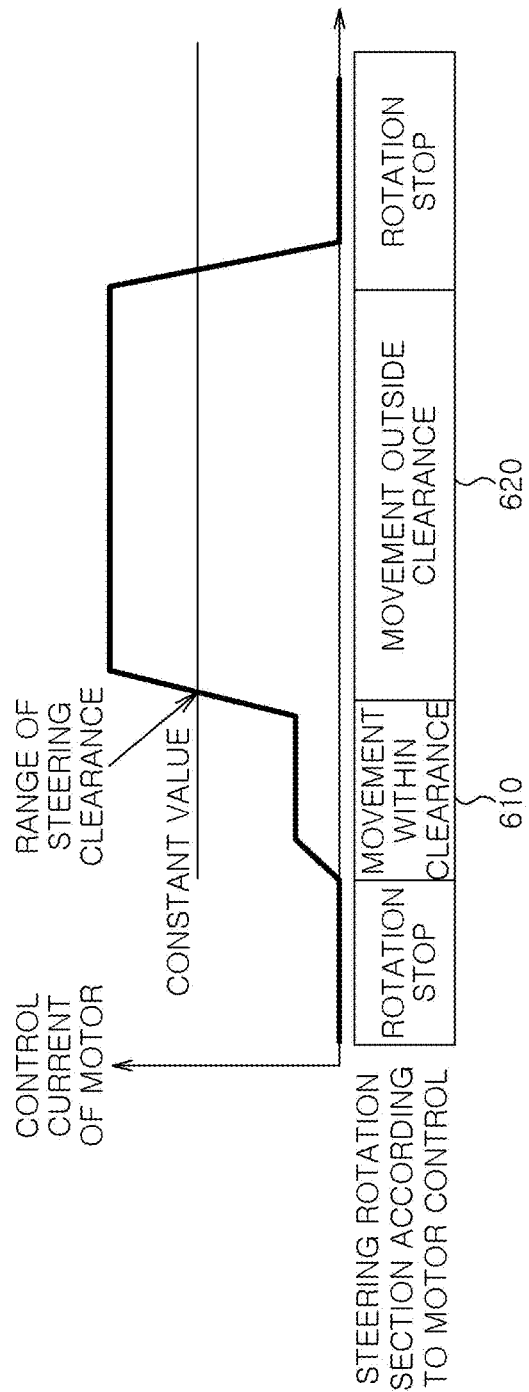
FIG. 6 is a graph showing a relationship between a control current and a steering clearance for a steering control motor according to various embodiments of the present disclosure.

FIG. 6 is a graph showing a relationship between a control current and a steering clearance for a steering control motor according to various embodiments of the present disclosure.

The graph in FIG. 6 shows a case in which a steering clearance is present only in a specific coupling section. The specific coupling section may be, for example, a coupling section between the steering wheel and the steering shaft. For clarity of description, for the total load capacity of the steering control motor 170, only components of the steering system are considered, and a ground surface or the like is ignored.

Referring to FIG. 6, a supply pattern of a control current may appear differently according to whether the motor 170 is driven and whether rotation is within a range of the steering clearance. Operation S520 includes, when the steering wheel rotates within the range of the steering clearance, supplying an increased control current as compared to when the steering control motor stops, and when the steering wheel rotates beyond the range of the steering clearance, supplying an increased control current as compared to when the steering wheel rotates within the range of the steering clearance.

When the steering control motor 170 is not driven and is stopped, the control current is not supplied.

The steering wheel may rotate when a control current is supplied. The control current depends on the load of the steering control motor 170. The load of the steering control motor 170 is a load to which a rotational force of the steering wheel is applied.

As described above with reference to FIG. 3, even when the steering wheel rotates within the range of the steering clearance, since a rotational force of the steering wheel is not transmitted to the wheel through components of other steering systems, components in the steering system, which serve as the load of the steering control motor 170 to which the rotational force of the steering wheel is applied while the steering wheel rotates within the range of the steering clearance, are some components of the overall steering structure, such as the steering wheel and components between the steering wheel and the steering shaft (for example, a steering column). While the steering wheel rotates within the steering clearance, the steering shaft and components between the steering shaft and the wheel (for example, gears, arms, and links) do not serve as the load of the steering control motor 170.

While the steering wheel rotates within the range of the steering clearance, since the loads of the steering control motor 170 are some components of the steering system, a control current appears to be initially increased and then maintained until there is a change in load of the steering control motor 170.

In this way, a relatively small control current is measured while the steering wheel rotates within the range of the steering clearance. In other words, since the load of the steering control motor 170 is not large enough to fully transmit a rotational force, the steering wheel is rotated with only a small amount of power (that is, a current), but the wheel is not steered.

In operation S520, since the steering wheel continues to rotate, the steering wheel rotates beyond the steering clearance. Since a rotational force of the steering wheel is transmitted to the wheel from a time point at which the steering clearance is exceeded, the load of the steering control motor 170 is the entire steering system. In this way, when the steering wheel rotates at a rotation angle outside the range of the steering clearance, the load of the steering control motor 170 has a higher load capacity as compared to when the steering wheel rotates within the range of the steering clearance.

Therefore, while the steering wheel rotates beyond the range of the steering clearance, a control current with a larger value is measured as compared to a control current measured while the steering wheel rotates within the range of the steering clearance. That is, since the load of the steering control motor 170 is large enough to fully transmit the rotational force, the wheel is also steered along with the rotation of the steering wheel.

In FIG. 6, since it is assumed that only a single steering clearance is present, a current section includes two current sections. However, the steering clearance may include a plurality of sub-clearances, each caused by a coupling defect in some sections between the components of the steering system that constitute the entire coupling section from the steering wheel to the wheel. For example, the steering clearance may include a first sub-clearance in a coupling section between the steering wheel and the steering shaft, and a second sub-clearance in a coupling section between an arm and another link subsequent to the steering shaft. In this case, the current section may include a first current section that is detectable due to a change in control current occurring due to a first load group corresponding to the first sub-clearance, a second current section that is detectable due to a change in control current additionally occurring due to a second load group corresponding to the second sub-clearance, and a third current section that is detectable due to a change in control current additionally occurring due to a third load group including the remaining loads of the steering system. Here, the first load group is a steering component up to the steering wheel in the entire coupling section. For example, the first load group may be the steering wheel. The second load group is a steering component from the steering shaft to the other links in the entire coupling section. The third load group is the remaining steering component to the wheel coupled from the arm coupled to other links in the second sub-clearance.

In this way, when the steering wheel is rotated at a rotation angle outside the range of the steering clearance, a rapid increase in control current occurs. The calculation unit 115 may set the compensation angle using an increase in control current.

To this end, in some embodiments, the operation of determining the compensation angle for the steering clearance based on the current measurement result of the control signal received from the current sensor 113 includes operation S540 of detecting a current section from the measurement result based on a change in control current, and an operation of determining the compensation angle for the steering clearance based on a rotation angle of the steering wheel in the detected current section.

In operation S540, the current section is set based on a change in control current. The calculation unit 115 may detect one or more current sections based on whether the control current changes such as by rising or falling. The current section may include a portion or the entirety of a section from a time point at which a change in control current starts to a point at which the change in control current ends and a next change in control current begins.

In some embodiments, the calculation unit 115 may detect a point at which a change in the control current measured during a measurement time is a rise and may set the entirety or a portion of a time section, which is a section from a detected rising point to a point at which the rise ends and a next rise begins, as a current section. In addition, the calculation unit 115 may detect a point at which a change in the control current measured during the measurement time is a rise and may set the entirety or a portion of a time section, which is a section from a detected rising point to a point at which the rise ends and a next fall begins, as a current section.

For example, when the calculation unit 115 receives the measurement result of FIG. 6, the calculation unit 115 may detect a first current section 610 consisting of the entirety of a time section from a point at which a rise is first detected to a point at which the rise ends and a next rise begins, and a second current section 620 consisting of the entirety of a time section from a detected rising point to a point at which the rise ends and a next fall begins.

In addition, the operation of determining the compensation angle for the steering clearance based on the current measurement result of the control signal is performed based on a rotation angle of the steering wheel in the detected current section. The operation of determining the compensation angle for the steering clearance includes operation S550 of obtaining GPS information of the traveling agricultural machine, operation S560 of detecting a current section in which a change in steering angle of the wheel occurs among the detected current sections based on the GPS information of the traveling agricultural machine, and an operation S570 of determining the compensation angle for the steering clearance based on a rotation angle of the steering wheel in the current section in which the change in steering angle of the wheel occurs.

In operation S550, the calculation unit 115 receives GPS information of the agricultural machine 100 from the GPS sensor 151. In some embodiments, the agricultural machine 100 may not receive real-time GPS information and may request the provision of GPS information according to the detection of the current section to receive the GPS information. In addition, the agricultural machine 100 may not receive GPS information for the entirety of a driving time and may selectively receive only GPS information from the detected current section. For example, the agricultural machine 100 may request only GPS information for a time of the detected current section and selectively receive the GPS information. Thus, unnecessary communication and data storage can be further reduced.

In operation S560, the calculation unit 115 calculates a driving direction of the agricultural machine 100 based on the GPS information of the agricultural machine 100 and detects a change in driving direction. When the change in driving direction of the agricultural machine 100 occurs, the calculation unit 115 determines that a rotational force of the steering wheel is transmitted to the wheel. The occurrence of the change in driving direction means that the steering wheel rotates beyond the range of the steering clearance, and thus the rotational force of the steering wheel is transmitted to the wheel, which changes a steering angle of the wheel.

The calculation unit 115 detects a current section in which a change in steering angle of the wheel occurs based on a time at which the change in driving direction occurs. A current section including the time at which the change in driving direction occurs is detected as the current section in which the change in steering angle of the wheel occurs.

In operation S570, the calculation unit 115 searches for a value of a rotation angle of the steering wheel in the current section, in which the change in the steering angle of the wheel occurs, from a rotation instruction transmitted from the calculation unit 115 to the driving unit 121. The compensation angle for the steering clearance is determined using the found value of the rotation angle.

In some embodiments, the calculation unit 115 may search for a value of a rotation angle of the steering wheel at any time point in a sub-section in which a current rises in the current section in which the change in steering angle of the wheel occurs and may determine the found angle of the rotation angle to be the compensation angle. For example, as shown in FIG. 6, a rotation angle corresponding to a certain value in a sub-section in which a current rises may be determined as the compensation angle. The determined compensation angle matches with the range of the steering clearance. In addition, in some embodiments, the calculation unit 115 may search for a value of a rotation angle of the steering wheel at a time point at which a current starts to rise in the current section in which the change in steering angle of the wheel occurs and may determine the found value of the rotation angle of the steering wheel to be the compensation angle for the steering clearance in one direction.

In addition, in some embodiments, the presetting operation may further include operation S580 of verifying the compensation angle based on the GPS information of the agricultural machine 100, and operation S590 of setting the compensation angle to a value of the compensation angle that is successfully verified.

Operation S580 includes operation S570 of rotating, by the calculation unit 115 and the driving unit 121, the steering wheel at a rotation angle exceeding the compensation angle in one direction determined in operation S570 while the agricultural machine 100 travels for a certain verification time, and an operation of, after the steering wheel rotates at the rotation angle exceeding the compensation angle, checking whether the wheel rotates at a steering angle corresponding to a difference angle between the rotation angle exceeding the compensation angle and the compensation angle.

The determined compensation angle in one direction may be at least one of a left direction compensation angle and a right direction compensation angle.

In operation S580, in order to check the rotation of the wheel, the calculation unit 115 may generate a rotation instruction including a rotation angle with a value of the compensation angle or more while the agricultural machine 100 travels for a certain verification time and may transmit the generated rotation instruction to the driving unit 121. The driving unit 121 rotates the steering wheel at a rotation angle having a value that is greater than or equal to a value of the compensation angle according to the rotation instruction.

The checking may include calculating a driving direction during the verification time based on GPS information during the verification time, calculating a steering angle of the wheel based on a difference in driving direction before and after rotation of the steering wheel during the verification time, and checking whether the calculated steering angle of the wheel and a difference angle between and the rotation angle exceeding the compensation angle and the compensation angle satisfy Equation 1.

When Equation 1 is not satisfied, the verifying of the compensation angle determined in operation S570 is determined to have failed. On the other hand, when Equation 1 above is satisfied, the verifying of the determined compensation angle is successful. Then, the calculation unit 115 stores the successfully verified compensation angle in the memory 117 and completes the presetting operation (S590).

In some embodiments, a driving environment of the presetting operation may be designated in advance. The agricultural machine 100 equipped with the autonomous driving device may start to travel in operation S510 in a place different from a working place which is a space in which agricultural work is performed and may perform operations S520 to S590 to perform the presetting operation. The different place may be a pre-designated flat area or a pre-designated space in a production plant. The different space provides a standardized learning environment because the attributes of a working place have relatively less influence on the load of the steering control motor 170 as compared to the working place.

In addition, in some embodiments, the presetting operation may be performed using the agricultural machine 100 in which one or more of the following conditions are designated as setting conditions: a) an engine ignition key is turned on, b) a brake switch is turned on, c) a driving speed of the agricultural machine 100 in operation S510 is maintained within a certain range, wherein the certain range is, for example, a range of 0 KPH to 10 KPH or 5 KPH to 10 KPH, and d) the steering wheel in operation S520 is rotated to an angle of −20° or 20°.

Since the presetting operation is performed individually for each agricultural machine 100, by using a control current, a steering clearance, which is difficult to analyze from a mechanical perspective, can be more easily analyzed to set a compensation angle. In addition, when only GPS information with an error of several meters to tens of centimeters is used, a compensation angle can be set more precisely.

According to various embodiments of the present disclosure, a method of presetting a compensation angle for a steering clearance may include operation S510 of driving the agricultural machine having the steering wheel in a reference state, an operation of supplying a control signal in the form of a current to the steering control motor 170 such that the steering wheel in the reference state rotates in one direction, operation S530 of receiving, by the calculation unit, a measurement result of the control signal from the current sensor 113, and an operation of determining the compensation angle for the steering clearance based on a current measurement result of the control signal. The operation of determining the compensation angle for the steering clearance based on the current measurement result of the control signal may include operation S550 of obtaining GPS information of the traveling agricultural machine, operation S560 of detecting a current section in which a change in steering angle of the wheel occurs among detected current sections based on the GPS information of the agricultural machine, and operation S570 of determining the compensation angle for the steering clearance based on a rotation angle of the steering wheel in the current section in which the change in steering angle of the wheel occurs. Operation S570 of determining the compensation angle for the steering clearance based on the rotation angle of the steering wheel in the current section in which the change in steering angle of the wheel occurs may be an operation of searching for a value of the rotation angle of the steering wheel at any time point in a sub-section in which a current rises in the current section in which the change in steering angle of the wheel occurs and determining the found value of the rotation angle to be the compensation angle. In one embodiment, in operation S570 of determining the compensation angle for the steering clearance based on the rotation angle of the steering wheel in the current section in which the change in steering angle of the wheel occurs, the value of the rotation angle of the steering wheel at a time point at which a current starts to rise in the current section in which the change in steering angle of the wheel occurs is searched for, and it is determined that the found rotation angle of the steering angle is the compensation angle for the steering clearance in one direction. In one embodiment, the method further includes operation S580 of verifying the compensation angle based on GPS information of the agricultural machine, and operation S590 of setting the compensation angle to a value of the compensation angle that is successfully verified. Operation S580 of verifying the compensation angle includes rotating the steering wheel at a rotation angle exceeding the determined compensation angle in one direction while the agricultural machine travels for a certain verification time, and after the steering wheel rotates at the rotation angle exceeding the compensation angle, checking whether the wheel rotates at a steering angle corresponding to a difference angle between the rotation angle exceeding the compensation angle and the compensation angle.

According to various embodiments of the present disclosure, a method of presetting a compensation angle for a steering clearance includes operation S510 of driving the agricultural machine having a steering wheel in a reference state, operation S520 of supplying a control signal in the form of a current to the steering control motor 170 such that the steering wheel in the reference state rotates in one direction, operation S530 of receiving, by the calculation unit, a measurement result of the control signal from the current sensor 113, an operation of determining the compensation angle for the steering clearance based on a current measurement result of the control signal, operation S580 of verifying the compensation angle based on GPS information of the agricultural machine, and operation S590 of setting the compensation angle to a value of the compensation angle that is successfully verified. Operation S580 of verifying the compensation angle includes rotating the steering wheel at a rotation angle exceeding the determined compensation angle in one direction while the agricultural machine travels for a certain verification time, and after the steering wheel rotates at the rotation angle exceeding the compensation angle, checking whether the wheel rotates at a steering angle corresponding to a difference angle between the rotation angle exceeding the compensation angle and the compensation angle.

In one embodiment, the operation of determining the compensation angle for the steering clearance based on the current measurement result of the control signal may include operation S550 of obtaining GPS information of the traveling agricultural machine, operation S560 of detecting a current section in which a change in steering angle of the wheel occurs among detected current sections based on the GPS information of the agricultural machine, and operation S570 of determining the compensation angle for the steering clearance based on a rotation angle of the steering wheel in the current section in which the change in steering angle of the wheel occurs.

In one embodiment, the driving unit 121 supplies a relatively small control signal to the steering control motor when the load capacity of the steering control motor 170 is relatively low and supplies a relatively large control signal to the steering control motor when the load capacity of the steering control motor 170 is relatively high. The operation of supplying the control signal to the steering control motor such that the steering wheel in the reference state rotates in one direction may include, when the steering wheel rotates within a range of the steering clearance, supplying an increased control signal as compared to when the steering control motor stops, and when the steering wheel rotates beyond the range of the steering clearance, supplying an increased control signal as compared to when the steering wheel rotates within the range of the steering clearance.

In one embodiment, in the components of the steering system that constitutes the entire coupling section from the steering wheel to the wheel, the steering clearance includes a first sub-clearance caused by a defect in a first coupling section, and a second sub-clearance caused by a defect in a second coupling section. The detected current section may include a first current section detectable due to a change in the control current occurring due to a first load group corresponding to the first sub-clearance, a second current section detectable due to a change in the control current occurring due to a second load group corresponding to the second sub-clearance, and a third current section detectable due to a change in the control current occurring due to a third load group including the remaining components among the components of the steering system that constitutes the entire coupling section from the steering wheel to the wheel in the agricultural machine.

In one embodiment, the operation of determining the compensation angle for the steering clearance based on the rotation angle of the steering wheel in the current section in which the change in steering angle of the wheel occurs may be an operation of searching for a value of the rotation angle of the steering wheel at any time point in a sub-section in which a current rises in the current section in which the change in steering angle of the wheel occurs and determining the found value of the rotation angle to be the compensation angle. In one embodiment, in the operation of determining the compensation angle for the steering clearance based on the rotation angle of the steering wheel in the current section in which the change in steering angle of the wheel occurs, the value of the rotation angle of the steering wheel at a time point at which a current starts to rise in the current section in which the change in steering angle of the wheel occurs is searched for, and it is determined that the found rotation angle of the steering angle is the compensation angle for the steering clearance.

In the agricultural machine 100 of FIG. 1, a rotation angle in a rotation instruction is corrected using the compensation angle set through the presetting operation of FIG. 5 according to the above-described embodiments, a control instruction having the corrected rotation angle is transmitted to the motor 170, the steering wheel is rotated by the corrected rotation angle, and thus the agricultural machine 100 accurately travels at an intended steering angle of the rotation instruction for autonomous driving.

Figure 7:
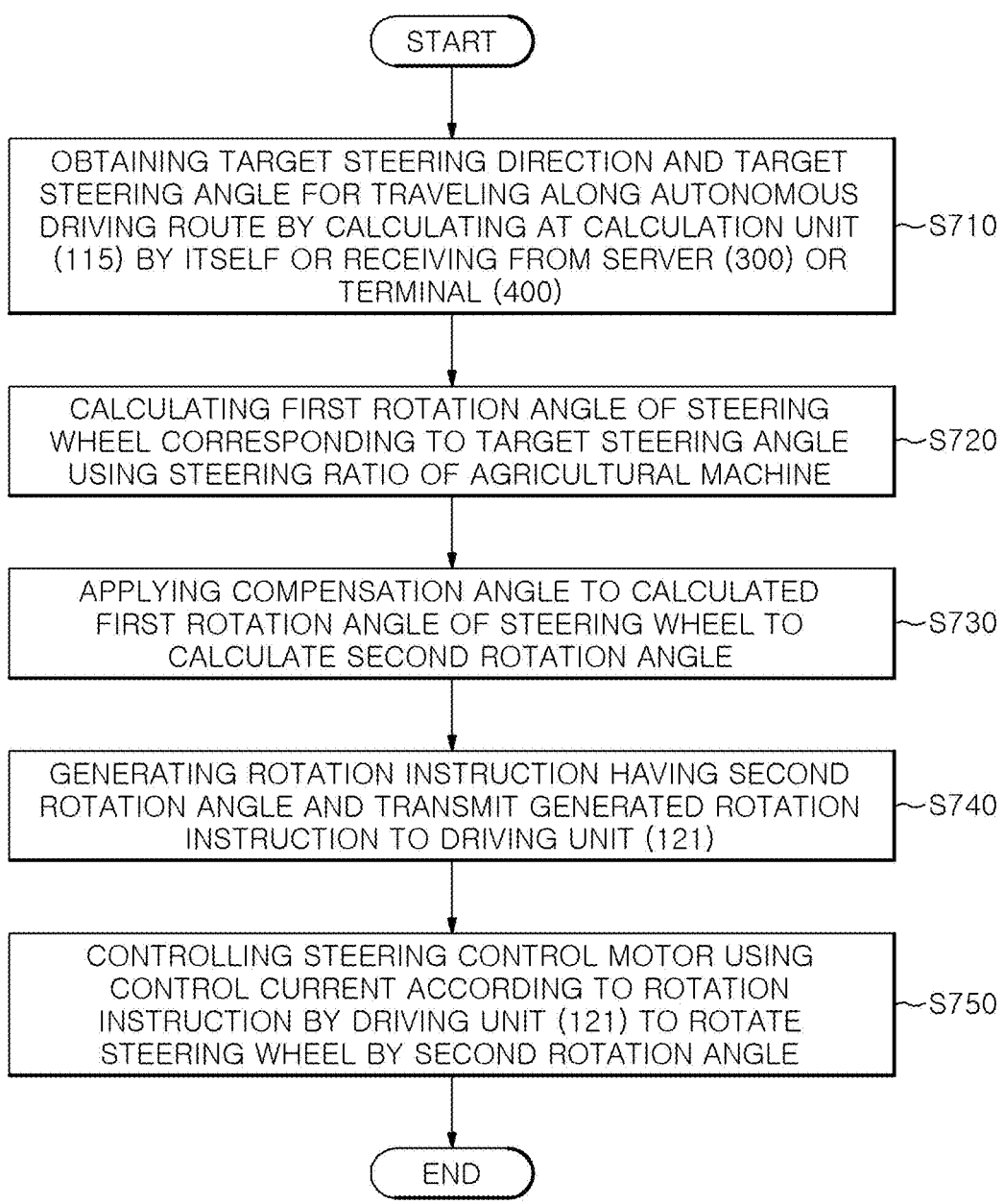
FIG. 7 is a flowchart of a method of autonomously driving an agricultural machine using a preset compensation angle according to still another aspect of the present disclosure.
Figure 8:
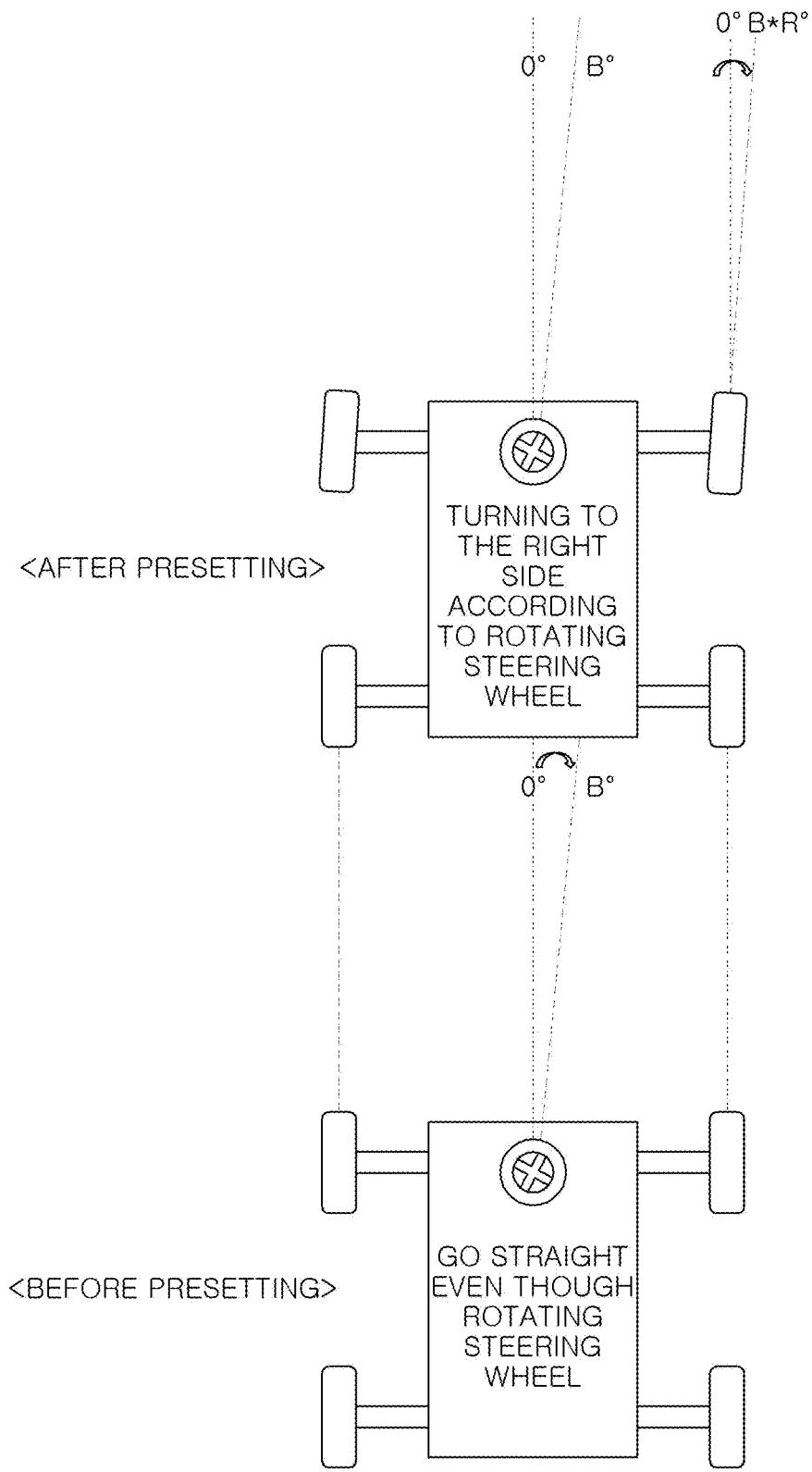
FIG. 8 is a schematic diagram of an autonomous driving result of FIG. 7.

FIG. 7 is a flowchart of a method of autonomously driving the agricultural machine 100 using a preset compensation angle according to another aspect of the present disclosure. FIG. 8 is a schematic diagram of an autonomous driving result of FIG. 7.

The method of FIG. 7 is performed by the autonomous driving device of FIG. 2 installed on the agricultural machine 100 while the agricultural machine 100, which has a steering clearance so that a compensation angle for correcting the steering clearance is preset, moves forward or rearward along an autonomous driving route. For example, when a range of the steering clearance is −A° to B°, a compensation angle is preset to −A° and B°. Here, a negative (−) angle indicates rotation in any one direction of left and right direction, and a positive (+) angle indicates rotation in other direction of left and right direction. Hereinafter, a negative angle indicates left rotation.

A process of the autonomous driving includes operation S710 in which the calculation unit 115 calculates a target steering angle for traveling along an autonomous driving route by itself or obtains the target steering angle from the server 300 or the terminal 400, operation S720 of calculating a first rotation angle of the steering wheel corresponding to the target steering angle using a steering ratio of the agricultural machine 100, operation S730 of applying the compensation angle to the calculated first rotation angle of the steering wheel to calculate a second rotation angle of the steering wheel, operation S740 of generating a rotation instruction having the second rotation angle of the steering wheel and transmitting the generated rotation instruction to the driving unit 121, and operation S750 of controlling, by the driving unit 121, the steering control motor using a control current according to the rotation instruction to rotate the steering wheel by the second rotation angle.

In operation S710, the calculation unit 115 obtains a target steering direction and the target steering angle for allowing the agricultural machine 100 to travel along the autonomous driving route. The target steering direction and target steering angle may be obtained as a combination of symbols and numbers. Here, a sign represents a positive or negative sign, and the number may be 0 or a positive number. Only when the wheel actually rotates by the target steering angle, does the agricultural machine 100 travel without deviating from the autonomous driving route. The target steering angle may be a value calculated by the calculation unit 115 itself using an autonomous driving program previously stored in the calculation unit 115 or may be a value received from the server 300 or the user terminal 400.

In operation S720, the calculation unit 115 calculates the first rotation angle of the steering wheel corresponding to the target steering angle using a steering ratio R of the agricultural machine 100 included in Equation 1. For example, the calculation unit 115 multiplies the target steering angle (_target wheel steering) by the steering ratio R to calculate the first rotation angle of the steering wheel (Steer_TgtAng=R×target wheel steering).

In operation S730, the calculation unit 115 applies the compensation angle to the first rotation angle Steer_TgtAng of the steering wheel calculated in operation S720 and corrects the first rotation angle Steer_TgtAng before a rotation instruction is input to the driving unit 121, thereby calculating the second rotation angle.

For example, when the target steering direction is a right direction, the second rotation angle is calculated as follows.

$$\text{Steer\_CtrlAng} = (\text{Steer\_TgtAng} + B) - \text{Steer\_CurAng}. \quad \text{[Equation 2]}$$

Here, Steer_CtrlAng denotes the second rotation angle, and B denotes a value of a right compensation angle B°. Steer_CurAng denotes a current position of the steering wheel before the target steering direction and the target steering angle are received. The current position of the steering wheel is expressed as a rotation angle by which the steering wheel rotates from the reference state. When the agricultural machine 100 moves straight, the current position Steer_CurAng of the steering wheel may be 0°.

In addition, when the target steering direction is a left direction, the second rotation angle is calculated as follows.

$$\text{Steer\_CtrlAng} = (\text{Steer\_TgtAng} - A) - \text{Steer\_CurAng}. \quad \text{[Equation 3]}$$

Here, Steer_CtrlAng denotes the second rotation angle, and −A denotes a value of a left compensation angle −A°. Steer_CurAng denotes a current position of the steering wheel before the target steering direction and the target steering angle are received.

Then, the calculation unit 115 generates a rotation instruction having the calculated second rotation angle Steer_CtrlAng calculated through Equation 2 or Equation 3 instead of the first rotation angle Steer_TgtAng calculated in operation S720 and transmits the generated rotation instruction to the driving unit 121 such that the wheel actually rotates in the target steering direction by the target steering angle (S740). The driving unit 121 generates a control current according to the rotation instruction of operation S740 and supplies the generated control current to the steering control motor 170, thereby allowing the steering control motor 170 to rotate by the second rotation angle Steer_CtrlAng (S750).

As a result, as shown in FIG. 8, despite having a steering clearance, the agricultural machine 100 may accurately travel in the target steering direction and at the target steering angle.

It will be apparent to those skilled in the art that the agricultural machine 100 may include other components not described herein to implement embodiments. For example, the agricultural machine 100 may include other hardware elements necessary for the operations described herein, which include input devices for data entry, output devices for printing or displaying other data, and driving-related components such as wheels and links.

When the embodiment of the present disclosure is implemented using hardware, application specific integrated circuits (ASICs), digital signal processors (DSPs), digital signal processing devices (DSPDs), programmable logic devices (PLDs), and field programmable gate arrays (FPGAs) configured to perform the embodiment of the present disclosure may be provided.

Meanwhile, the above-described method may be written as a program that can be executed by a computer and may be implemented in a general-purpose digital computer that can execute the program using computer-readable recording media. In addition, a data structure used in the above-described method can be recorded on a computer-readable storage medium through various methods. It should be understood that program storage devices that can be used to describe storage devices including computer code executable to perform various methods of the present disclosure do not include temporary objects such as carrier waves or signals. The computer-readable storage media include storage media such as magnetic recording media (for example, a read-only memory (ROM), a floppy disk, and a hard disk) and optical readable media (for example, a compact disc read-only memory (CD-ROM) and a digital video disc (DVD)).

The above-describe embodiments are implemented by combining the components and the features of the present disclosure in a predetermined form. Each component or feature should be considered as being selective unless explicitly described separately. Each component or feature may be practiced in a form in which it is not combined with other components or features. In addition, the embodiments of the present disclosure may be configured by combining some components and/or features. An order of the operations described in the embodiments of the present disclosure may be changed. Some components or features of any of the embodiments may be included in other embodiments or may be replaced by the corresponding components or features of other embodiments. It is apparent that the embodiments may be configured by combining claims which do not have an explicitly cited relation in the claims and may be included in new claims which are amended after filing.

It is apparent to those skilled in the art that the embodiments of the present disclosure may be embodied in other specific forms without departing from the technical idea and essential features of the present disclosure. Accordingly, the above embodiments should be considered in all respects as illustrative rather than restrictive. The scope of the present disclosure is to be determined by a reasonable interpretation of the appended claims and all the changes within an equivalent range of the present disclosure.

By using a method of presetting a compensation angle for a steering clearance according to embodiments of the present disclosure, a steering angle can be accurately calculated to control a steering operation of an autonomous agricultural machine. As a result, the method of presetting a compensation angle for a steering clearance according to the embodiments of the present disclosure is likely to be used in the agricultural industry in which the frequency of use of an autonomous agricultural machine has recently increased.

The invention claimed is:

1. A method of presetting a compensation angle for a steering clearance performed by a computing device including a processor, wherein the computing device is installed on an autonomous agricultural machine and includes a calculation unit configured to process an autonomous driving-related operation, a driving unit configured to supply a control signal in a form of current to a steering control motor configured to control rotation of a steering wheel according to an instruction of the calculation unit, a current sensor configured to measure the control signal, and a Global Positioning System (GPS) communication unit configured to determine a position of the autonomous agricultural machine, the method comprising:
driving an agricultural machine having the steering wheel in a reference state;
supplying the control signal to the steering control motor such that the steering wheel in the reference state rotates in one direction;
receiving, by the calculation unit, a measurement result of the control signal from the current sensor; and
determining a compensation angle for the steering clearance based on a current measurement result of the control signal,
wherein the determining of the compensation angle for the steering clearance based on the current measurement result of the control signal includes:
obtaining GPS information of the agricultural machine that is travelling;
detecting current sections from the measurement result based on a change in a control current, the current sections defined as time sections from a rising or falling point of the control current to a next rising or falling point;
detecting a current section in which a change in steering angle of a wheel occurs among the detected current sections based on the GPS information of the agricultural machine; and
determining the compensation angle for the steering clearance based on a rotation angle of the steering wheel in the current section in which the change in steering angle of the wheel occurs.

2. The method of claim 1, wherein the driving unit supplies a relatively small control signal to the steering control motor when load capacity of the steering control motor is relatively low and supplies a relatively large control signal to the steering control motor when the load capacity of the steering control motor is relatively high, and
the supplying of the control signal to the steering control motor such that the steering wheel in the reference state rotates in one direction includes:
when the steering wheel rotates within a range of the steering clearance, supplying an increased control signal as compared to when the steering control motor stops; and when the steering wheel rotates beyond the range of the steering clearance, supplying an increased control signal as compared to when the steering wheel rotates within the range of the steering clearance.

3. The method of claim 2, wherein, in components of a steering system that constitutes an entire coupling section from the steering wheel to the wheel, the steering clearance includes a first sub-clearance caused by a defect in a first coupling section, and a second sub-clearance caused by a defect in a second coupling section, and
the detected current section includes a first current section detectable due to a change in the control current occurring due to a first load group corresponding to the first sub-clearance, a second current section detectable due to a change in the control current occurring due to a second load group corresponding to the second sub-clearance, and a third current section detectable due to a change in the control current occurring due to a third load group including remaining components among the components of the steering system that constitutes the entire coupling section from the steering wheel to the wheel in the agricultural machine.

4. The method of claim 1, wherein the determining of the compensation angle for the steering clearance based on the rotation angle of the steering wheel in the current section in which the change in steering angle of the wheel occurs further includes:
searching for a value of the rotation angle of the steering wheel at any time point in a sub-section among the current section in which the change in steering angle of the wheel occurs, wherein a current rises in the sub-section; and
determining the searched rotation angle to be the compensation angle for the steering clearance in one direction.

5. The method of claim 1, further comprising:
verifying the compensation angle based on the GPS information of the agricultural machine; and
setting the compensation angle to a value of the compensation angle that is successfully verified,
wherein the verifying of the compensation angle further includes:
rotating the steering wheel at a rotation angle exceeding the determined compensation angle in one direction while the agricultural machine travels for a certain verification time; and
after the steering wheel rotates at the rotation angle exceeding the compensation angle, checking whether the wheel rotates at a steering angle corresponding to a difference angle between the rotation angle exceeding the compensation angle and the compensation angle.

6. A non-transitory computer-readable recording medium on which a program for performing the method of presetting a compensation angle for a steering clearance of claim 1 is recorded.

7. The method of claim 1, wherein the detecting current sections from the measurement result based on a change in the control current includes:
detecting a point at which the change in the control current measured during a measurement time is a rise and sets, as the current section, an entirety or a portion of a time section corresponding to a section from a detected rising point to a point at which the rise ends and a next rise begins, or
detecting a point at which a change in the control current measured during the measurement time is a rise and may set, as the current section, an entirety or a portion of a time section corresponding to a section from a detected rising point to a point at which the rise ends and a next fall begins.

8. The method of claim 1, wherein the obtaining GPS information of the agricultural machine in motion is selectively receiving only GPS information on the detected current section.

9. An autonomous agricultural machine, comprising:
an autonomous driving device in which a compensation angle for a steering clearance is set by a method of presetting a compensation angle for a steering clearance, which is performed by a computing device including a processor,
wherein the computing device is installed on an autonomous agricultural machine and includes a calculation unit configured to process an autonomous driving-related operation, a driving unit configured to supply a control signal in a form of current to a steering control motor configured to control rotation of a steering wheel according to an instruction from the calculation unit, and a current sensor configured to measure the control signal, wherein the method of presetting a compensation angle for a steering clearance includes driving an agricultural machine having the steering wheel in a reference state, supplying the control signal to the steering control motor such that the steering wheel in the reference state rotates in one direction, receiving, by the calculation unit, a measurement result of the control signal from the current sensor, and determining the compensation angle for the steering clearance based on a current measurement result of the control signal, wherein the determining of the compensation angle for the steering clearance based on the current measurement result of the control signal includes:
obtaining GPS information of the agricultural machine in motion;
detecting current sections from the measurement result based on a change in a control current, the current sections defined as time sections from a rising or falling point of the control current to a next rising or falling point;
detecting a current section in which a change in steering angle of a wheel occurs among the detected current sections based on the GPS information of the agricultural machine; and
determining the compensation angle for the steering clearance based on a rotation angle of the steering wheel in the current section in which the change in steering angle of the wheel occurs;

wherein the autonomous agricultural machine is provided such that:
a target steering angle for driving the agricultural machine along on an autonomous driving route is obtained,
a first rotation angle of the steering wheel corresponding to the target steering angle is calculated using a steering ratio of the agricultural machine,
the compensation angle is applied to the calculated first rotation angle of the steering wheel to calculate a second rotation angle of the steering wheel,
a rotation instruction having the second rotation angle of the steering wheel is generated and transmitted to the driving unit, and the driving unit controls the steering control motor based on a control signal according to the rotation instruction to rotate the steering wheel by the second rotation angle,
when a target steering direction is a right direction, the second rotation angle is calculated through the following equation:

$$\text{Steer\_CtrlAng} = (\text{Steer\_TgtAng} + B) - \text{Steer\_CurAng}, \quad [\text{Equation 1}]$$

wherein Steer_CtrlAng denotes the second rotation angle, B denotes a value of a right compensation angle (B°), Steer_CurAng denotes a current position of the steering wheel before the target steering direction and the target steering angle are received, and the current position of the steering wheel is expressed as a rotation angle by which the steering wheel rotates from the reference state, and when the target steering direction is a left direction, the second rotation angle is calculated through the following equation:

$$\text{Steer\_CtrlAng} = (\text{Steer\_TgtAng} - A) - \text{Steer\_CurAng}, \quad [\text{Equation 2}]$$

wherein −A denotes a value of a left compensation angle (−A°).

* * * * *